(12) United States Patent
Schuller et al.

(10) Patent No.: US 9,903,422 B2
(45) Date of Patent: Feb. 27, 2018

(54) METHOD FOR OPERATING A CLUTCH TRANSMISSION, CLUTCH TRANSMISSION

(75) Inventors: Dietmar Schuller, Altmannstein (DE); Stefan Ammler, Bergheim (DE); Hans-Peter Fleischmann, Stammham (DE)

(73) Assignee: Audi AG, Ingolstadt (DE)

( * ) Notice: Subject to any disclaimer, the term of this patent is extended or adjusted under 35 U.S.C. 154(b) by 801 days.

(21) Appl. No.: 14/115,750

(22) PCT Filed: Apr. 30, 2012

(86) PCT No.: PCT/EP2012/001847
§ 371 (c)(1),
(2), (4) Date: Jan. 9, 2014

(87) PCT Pub. No.: WO2012/152393
PCT Pub. Date: Nov. 15, 2012

(65) Prior Publication Data
US 2014/0345261 A1    Nov. 27, 2014

(30) Foreign Application Priority Data

May 6, 2011 (DE) .................. 10 2011 100 802

(51) Int. Cl.
| | |
|---|---|
| F16D 25/00 | (2006.01) |
| F16D 28/00 | (2006.01) |
| F16H 61/00 | (2006.01) |
| F16H 61/688 | (2006.01) |
| F16H 61/30 | (2006.01) |
| F16D 121/24 | (2012.01) |

(52) U.S. Cl.
CPC ......... *F16D 28/00* (2013.01); *F16H 61/0031* (2013.01); *B60Y 2400/3084* (2013.01);
(Continued)

(58) Field of Classification Search
CPC ............ F16H 57/0473; F16H 61/0031; F16H 2061/305; F16H 61/688; F16H 2061/0034;
(Continued)

(56) References Cited

U.S. PATENT DOCUMENTS 5,944,159 A * 8/1999 Schneider ............... F15B 1/033
192/85.56
6,631,651 B2   10/2003 Petrzik
(Continued)

FOREIGN PATENT DOCUMENTS

| DE | 101 34 121 A1 | 10/2002 |
|---|---|---|
| DE | 102 43 282 A1 | 4/2004 |

(Continued)

OTHER PUBLICATIONS

International Search Report issued by the European Patent Office in International Application PCT/EP2012/001847, dated Nov. 7, 2012.

*Primary Examiner* — Thomas E Lazo
*Assistant Examiner* — Dustin T Nguyen
(74) *Attorney, Agent, or Firm* — Henry M. Feiereisen LLC

(57) ABSTRACT

According to a method for operating a clutch transmission, especially a dual clutch transmission, which includes a hydraulic circuit having at least one pump for delivering hydraulic medium and at least one pressure accumulator for accommodating and making available a hydraulic medium under pressure, the pump associated with an electric motor is operated depending on a charge requirement of the pressure accumulator. To determine the charge requirement, the pump is driven by the electric motor, and the current consumed by the electric motor in the process is detected to determine the charge requirement.

14 Claims, 1 Drawing Sheet

(52) U.S. Cl.
CPC ........ *F16D 2121/24* (2013.01); *F16H 61/688* (2013.01); *F16H 2061/0034* (2013.01); *F16H 2061/305* (2013.01)

(58) Field of Classification Search
CPC ............ B60Y 2400/3084; F16D 28/00; F16D 2121/24; F15B 2211/6309; F15B 2211/6651
USPC ............... 192/3.57, 3.58, 85.61; 477/168, 57
See application file for complete search history.

(56) References Cited

U.S. PATENT DOCUMENTS

| | | | |
|---|---|---|---|
| 8,042,672 | B2 | 10/2011 | Grethel et al. |
| 8,826,760 | B2 * | 9/2014 | Feldt .................. F16H 57/0446 74/335 |
| 2002/0046913 | A1 | 4/2002 | Harries |
| 2005/0023102 | A1 * | 2/2005 | Brissenden ........... F16D 25/123 192/85.63 |
| 2009/0321209 | A1 | 12/2009 | Grethel et al. |
| 2011/0314945 | A1 | 12/2011 | Brandenburg et al. |

FOREIGN PATENT DOCUMENTS

| | | |
|---|---|---|
| DE | 10 2008 009 653 A1 | 9/2008 |
| DE | 10 2009 041 236 A1 | 3/2011 |
| EP | 1 150 040 A2 | 10/2001 |
| EP | 1253341 A2 | 10/2002 |
| EP | 1400733 A2 | 3/2004 |
| WO | WO 2010083862 A1 | 7/2010 |

* cited by examiner

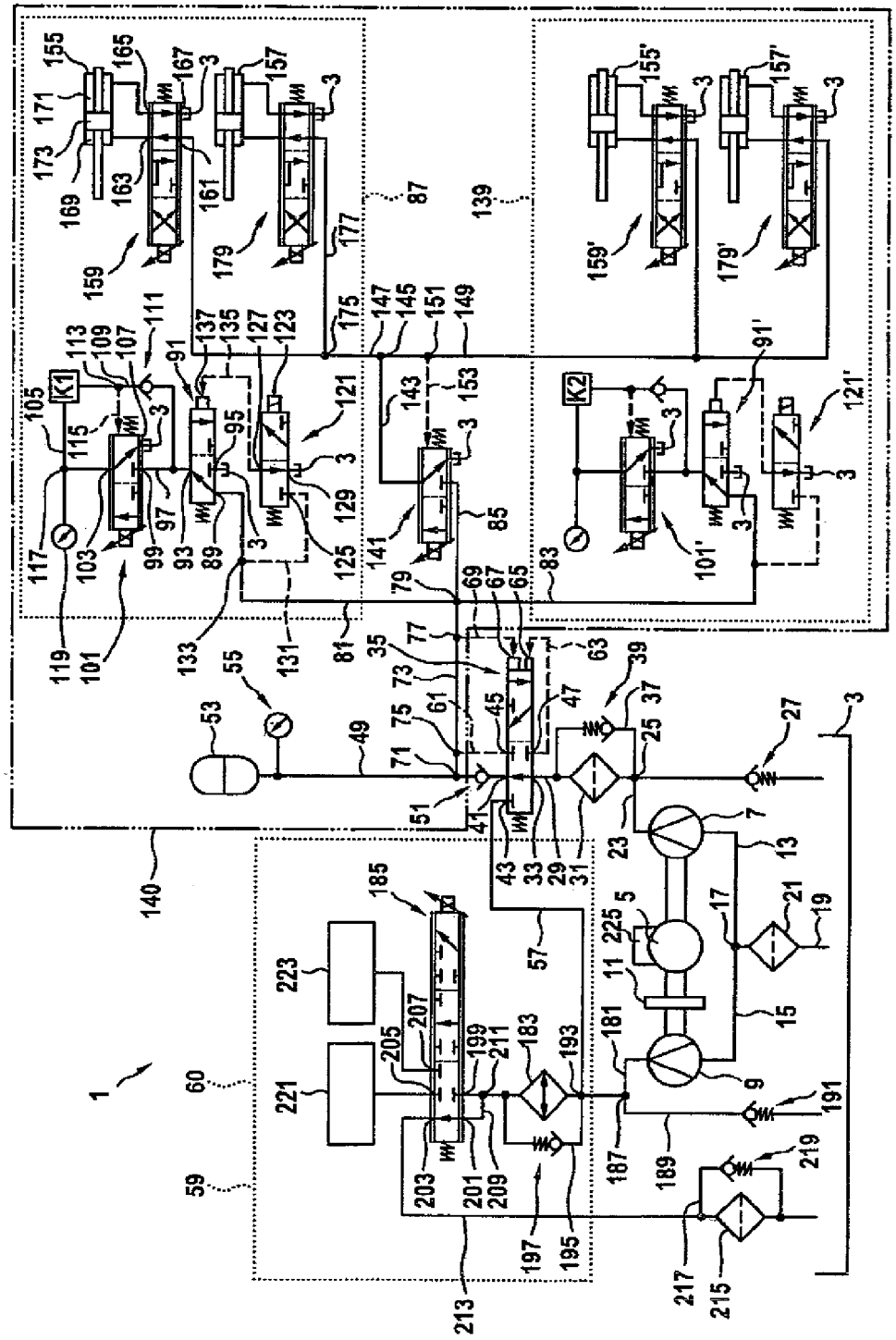

METHOD FOR OPERATING A CLUTCH TRANSMISSION, CLUTCH TRANSMISSION

CROSS-REFERENCES TO RELATED APPLICATIONS

This application is the U.S. National Stage of International Application No. PCT/EP2012/001847, filed Apr. 30, 2012, which designated the United States and has been published as International Publication No. WO 2012/152393 and which claims the priority of German Patent Application, Serial No. 10 2011 100 802.4, filed May 6, 2011, pursuant to 35 U.S.C. 119(a)-(d).

BACKGROUND OF THE INVENTION

The invention relates to a hydraulic circuit for controlling and cooling a clutch transmission, in particular a dual clutch transmission, in particular of a motor vehicle, with two clutch cylinders and a plurality of preferably double-sided actuatable switching cylinders.

Dual clutch transmissions are preferably used in passenger cars. A dual clutch transmission generally includes two coaxially disposed transmission input shafts, which are each associated with a sub-transmission. A clutch is associated with each of the transmission input shafts, via which the transmission input shaft of the respective sub-transmission can be frictionally coupled to the output of an engine, preferably an internal combustion engine of a motor vehicle. A first of the two sub-transmissions typically includes the odd gears, whereas a second of the two sub-transmissions includes the even gears and the reverse gear.

Typically, one of the sub-transmissions is active while driving, which means that the transmission input shaft associated with this sub-transmission is coupled to the engine via its associated clutch. A gear providing a current gear ratio is engaged in the active sub-transmission. A controller determines whether the next higher or next lower gear is to be engaged depending on the driving situation. This gear which will probably be used next is selected in the second, inactive sub-transmission. When changing gears, the clutch of the inactive sub-transmission is engaged, while the clutch of the active portion is disengaged. Preferably, opening of the clutch of the active sub-transmission and closing of the clutch of the inactive sub-transmission overlap so that the flow of force from the engine to the drive shaft of the motor vehicle is not at all or only briefly interrupted. As a result of the gear change, the previously active sub-transmission becomes inactive, while the previously inactive sub-transmission becomes the active sub-transmission. Thereafter, the gear expected to be used next can be engaged in the now inactive sub-transmission.

The gears are engaged and disengaged via elements, preferably via the shift rails that are actuated by hydraulic cylinders, also known as switching cylinders, which have already been mentioned above. The hydraulic cylinders are preferably formed as double-acting hydraulic cylinders, in particular synchronous cylinders or differential cylinders, so that preferably two gears may be associated with each switching cylinder. Alternatively, single-acting hydraulic cylinders may also be provided. The hydraulic cylinders operating the elements, in particular the shift rails are also referred to as gear selector cylinders. A gear selector cylinder designed as a synchronous cylinder to which in particular two gears are assigned, has preferably three switching positions, wherein in a first switching position a first defined gear is engaged, in a second switching position another defined gear is engaged, and in a third switching position none of the two above-mentioned gears is engaged.

The clutches associated with the two sub-transmissions are also hydraulically actuated, i.e. closed or opened. Preferably, the clutches each close when hydraulic pressure is applied, whereas they open when no hydraulic pressure is applied, i.e. when pressure is relieved in a hydraulic cylinder associated with the respective clutch which is also referred to as clutch cylinder, as mentioned above.

In addition, the operation of a dual clutch transmission is known per se and will thus not be discussed here in detail.

The structure and the operation described in the preceding paragraphs preferably also apply to or are related to the subject matter of the invention.

As already indicated, dual clutch transmissions are controlled or regulated as well as cooled by a hydraulic circuit. This hydraulic circuit, or subassemblies thereof, and methods associated therewith are the object of the invention.

Conventional clutch transmissions include at least one pump for conveying a hydraulic medium and at least one pressure accumulator for receiving and providing a pressurized hydraulic medium. The hydraulic medium conveyed by the pump is supplied to the pressure store to make pressurized hydraulic medium available as needed, even when the pump is not operated, or to maintain the pressure in the hydraulic circuit. An electric motor which is operated depending on the charge requirements of the pressure accumulator is associated with the pump to drive the pump.

A clutch transmission is known in the art, for example from the German published patent application 102 43 282 A1, wherein the pressure in the hydraulic circuit is measured with a pressure sensor. When the pressure in the hydraulic circuit decreases, for example because an adequate supply of pressurized hydraulic medium is no longer provided by the accumulator, the electric motor is switched on to convey new hydraulic medium into the hydraulic circuit in order to increase the prevailing pressure therein. However, a pressure sensor in the hydraulic circuit requires a certain installation space and corresponding manufacturing costs.

SUMMARY OF THE INVENTION

It is therefore the object of the invention to provide a method and a clutch transmission that ensure in a simple and inexpensive way a sufficiently high pressure in the hydraulic circuit.

The object underlying the invention is attained by a method of operating a clutch transmission, with a hydraulic circuit having at least one pump for conveying a hydraulic medium and at least one pressure accumulator for receiving and providing a pressurized hydraulic medium, wherein the method includes determining a charge requirement of the at least one pressure accumulator from a consumption of electric current while the pump is driven by an electric motor, and operating the electric motor associated with the at least one pump based on the determined charge requirement of the at least one pressure accumulator. The object underlying the invention is also attained by a clutch transmission with a hydraulic circuit having at least one pump conveying a hydraulic medium, an electric motor driving the at least one pump, at least one pressure accumulator for receiving and providing a pressurized hydraulic medium, a measuring device for measuring consumption of electric current of the electric motor, and a control circuit determining the charge requirement of the at least one pressure accumulator from the measured consumption of electric current while the pump is driven by the electric motor, and operating the electric motor based on a charge requirement of the at least one pressure accumulator.

The inventive method is characterized in that for determining the charge requirement, the at least one pump is driven by the electric motor and the current consumption of the electric motor is determined. This exploits the fact that the backpressure in the hydraulic circuit operating on the pump is reflected in the current consumption of the electric motor. The higher the pressure in the hydraulic circuit is, the higher is the current consumption of the electric motor necessary to operate the pump against the backpressure. For determining the charge requirement, the electric motor is thus first turned on and the pump is driven and the current consumption of the electric motor is measured to determine whether a charge requirement of the accumulator exists or not. This eliminates the otherwise necessary pressure sensor, thus potentially making better use of existing installation space and reducing parts costs. The current consumption of the electric motor is particularly preferably determined or measured by drive electronics associated with the electric motor. Preferably, the electric motor is a variable-speed electric motor.

According to an advantageous embodiment of the invention, the hydraulic circuit includes an actuating circuit having the pressure accumulator, in particular a high-pressure circuit, and a cooling circuit, in particular a low-pressure circuit, wherein depending on the pressure of the pressure accumulator, which corresponds at least substantially to the pressure in the hydraulic circuit or in the actuating circuit, the hydraulic medium is transported or conveyed to the actuating circuit and the cooling circuit, in particular by a pressure control valve. The hydraulic circuit is thus divided into two sub-circuits, wherein one sub-circuit, the actuating circuit, is used to actuate the clutch and the switching cylinder, while the other sub-circuit, the cooling circuit, is used to cool in particular at least one, preferably a plurality of clutches of the clutch transmission. In operation, the hydraulic medium conveyed by the conveying device which includes at least one pump and the electric motor, is supplied either to the actuating circuit or to the cooling circuit. If the pressure in the actuating circuit already corresponds to a maximum pressure or an operating pressure, then the hydraulic medium is preferably supplied to the cooling circuit. Otherwise, the hydraulic medium is preferably supplied to the actuating circuit so as to ensure sufficient pressure therein, or to charge the pressure accumulator. Preferably, a hydraulically actuated switching valve is provided for this purpose.

Preferably, it is determined as a function of the current consumption whether the hydraulic medium is supplied to the actuating circuit and to the cooling circuit. If it is known that, depending on the prevailing pressure, the hydraulic medium is conveyed either to the actuating circuit or to the cooling circuit, then the actually present condition can be determined from the current consumption. Typically, the pressure in the actuating circuit is usually significantly higher than in the cooling circuit, so that the current consumption for conveying the hydraulic medium to the actuating circuit is substantially different from the current consumption for conveying the hydraulic medium to the cooling circuit. It is thus possible in a simple way to determine by measuring the current consumption to which hydraulic sub-circuit the hydraulic medium circuit is currently conveyed, and whether or not a charge requirement exists.

Preferably, the electric motor is switched on at predeterminable points in time and accelerated to a predeterminable rotation speed, in particular via a predeterminable rotation speed ramp. The predeterminable points in time may be predeterminable time intervals or absolute points in time with corresponding mutual time intervals. The time intervals are advantageously selected such that the charge requirement is measured with sufficient regularity so as to prevent a critical pressure drop.

According to an advantageous embodiment of the invention, when the detected current consumption exceeds a predeterminable first limit value, the electric motor is switched into a charging mode. In the charging mode, the electric motor is accelerated to a charging rotation speed for driving the hydraulic medium into the actuating circuit with an appropriate pressure and volume flow to thereby charge the accumulator. Since the actuating circuit with the pressure accumulator has a higher pressure than the cooling circuit, the predeterminable first limit value must be exceeded to detect that the hydraulic medium is conveyed to the actuating circuit, i.e. that a charge requirement exists.

Furthermore, when the measured current consumption is less than a predeterminable second limit value, the electric motor is advantageously switched off. The second predeterminable limit value is here advantageously less than or equal to the first predeterminable limit value. When the measured current consumption is less than the second limit value, it is assumed that the hydraulic medium is conveyed to the cooling circuit due to lower backpressure, and that therefore no charge requirement exists. Accordingly, the electric motor can be switched off, unless there is a cooling demand.

In a particularly preferred embodiment, the temperature of the hydraulic medium is measured and the measured value of the current is weighted depending on the temperature of the hydraulic medium. The current consumption is thus related to or classified/weighted by the current temperature of the hydraulic medium. This ensures that the temperature-dependent viscosity of the hydraulic medium, especially of the hydraulic oil, which obviously also affects the backpressure, is taken into account when operating the electric motor and measuring the current consumption. Advantageously, the measured current consumption is always determined in relation to the actual rotation speed of the electric motor. It can be quickly and easily determined during operation, for example, from a characteristic curve and/or a characteristic curve field whether or not an accumulator charge requirement exists.

The clutch transmission of the invention, which includes means for measuring the charge requirement of the accumulator, is characterized in that the means include at least one device for measuring the current consumption of electric motor. The means are preferable one or more current sensors, which may be formed, for example, by the drive electronics associated with the electric motor. The charge requirement of the pressure accumulator can be inferred from the measured current consumption, as described above, resulting in the aforedescribed advantages.

In a particularly preferred embodiment, the hydraulic circuit includes an actuating circuit, in particular high-pressure circuit, and a cooling circuit, in particular a low-pressure circuit, wherein a hydraulically actuatable switching valve is provided which conveys the hydraulic medium to the actuating circuit with the pressure accumulator or to cooling circuit, depending on the actual pressure in the actuating circuit or in the pressure accumulator. The switching valve is thus interconnected between the conveying device which includes at least the electric motor and the at least one pump, and the actuating circuit and the cooling circuit so as to transport the conveyed hydraulic medium into the one or the other hydraulic sub-circuit.

Furthermore, the pressure control valve may be constructed as a pressure-actuated 2-way switching valve, in particular with a switching hysteresis, in particular a 2/2-way switching valve, a 4/2-way switching valve or a 5/2-way switching valve. The so-constructed pressure control valve automatically switches over when the pressure in the actuating circuit exceeds a certain limit value, so that the hydraulic medium is then transported to the cooling circuit. The pressure control valve switches back only when pressure falls below a pressure value that is significantly below the first limit value, so that the hydraulic medium is conveyed again into the actuating circuit. For this purpose, the pressure control valve has advantageously two valve faces, wherein one of the valve faces is connected to the actuating circuit and the other of the valve faces is connected to the cooling circuit, wherein both valve faces are associated with a slider of the pressure regulating valve so that—depending on the pressure conditions—the slider is moved by the pressurized valve faces into one or the other switching position.

BRIEF DESCRIPTION OF THE DRAWING

The invention will now be described with reference to the drawing, which shows in the FIG. 1 the hydraulic circuit of a clutch transmission according to the invention.

DETAILED DESCRIPTION OF PREFERRED EMBODIMENTS

The hydraulic circuit of the invention will now be described in detail with reference to FIG. 1.

FIG. 1 shows a hydraulic circuit 1 which is used to actuate, and in particular to couple and engage and disengage gears of a dual clutch transmission and to cool the transmission. The hydraulic circuit 1 includes a tank 3, serving in particular as a reservoir or sump for a hydraulic medium used for operation and cooling, in which the hydraulic medium is preferably stored unpressurized. An electric motor 5 driving a first pump 7 and a second pump 9 is provided. Preferably, the speed and direction of rotation of the electric motor 5 can be controlled, preferably regulated. The first pump 7 is fixedly connected to the electric motor 5, i.e. without a separating element. In other words, the pump 7 is always driven when the electric motor 5 is running and the hydraulic medium is preferably conveyed in the same direction in the both directions of rotation. The pump 9 is preferably connected to the electric motor 5 by way of a separating element 11. Accordingly, the pump 9 can be decoupled from the electric motor 5, so that the pump 9 is not running when the electric motor 5 is running. The separating element 11 is preferably formed as a clutch or an overrunning clutch, wherein in the second situation the direction of rotation of the electric motor 5 determines whether hydraulic fluid is conveyed by the pump 9 or not.

The first pump 7 and the second pump 9 are each connected via a corresponding conduit 13, 15 to a junction 17 into which an additional conduit 19 opens. This additional conduit 19 connects the tank 3 to the junction 17 through a suction filter 21. Overall, inlets of the pump 7, 9 are thus connected to the tank 3 via the conduits 13, 15, the junction 17 and the conduit 19 having the suction filter 21.

The outlet of the first pump 7 is connected to a conduit 23 which leads to a junction 25. The junction 25 is connected to the tank 3 via a pressure relief valve 27. The pressure relief valve 27 can open under overpressure in the direction of the tank 3. Furthermore, a conduit 29, which leads via a pressure filter 31 to a port 33 of a switching valve 35, originates from the junction 25.

The pressure filter 31 may be bypassed by a bypass 37, wherein a differential pressure valve 39 is arranged in the bypass 37, which allows bypassing the filter 31 in the direction of the connection 33 under overpressure. The differential pressure valve 39 opens starting at a preset differential pressure across the pressure filter 31.

The switching valve 35 is embodied as a 5/2-way valve, which has four additional ports 41, 43, 45, 47 in addition to the port 33. In a first switching state of the switching valve 35 shown in FIG. 1, the port 33 is connected to the port 41, whereas the other ports 43, 45 and 47 are connected blind, i.e. they are closed. The port 41 opens into a conduit 49 in which a check valve is disposed 51. The conduit 49 leads to a pressure accumulator 53, wherein a pressure sensing device 55 is hydraulically connected to the conduit 49 upstream of the pressure accumulator 53.

In a second switching state of the switching valve 35 illustrated in FIG. 1, the port 33 is connected to the port 43 which opens into a conduit 57 that leads to a hydraulic sub-circuit 59 which is used, in particular, to cool the clutches of the dual clutch transmission. In this second switching state, the port 41 is connected blind, and the port 45 is connected to the port 47. In this case, a conduit 61 opens into the port 45 which is subjected to the pressure of the hydraulic medium in the pressure accumulator 53. The port 47 opens into a conduit 63 which is hydraulically connected to a first valve face 65 of the switching valve 35. A second valve face 67 of the switching valve 35 is permanently subjected to the pressure of the pressure accumulator 53 via a conduit 69.

A conduit 73 branches off from the conduit 49 at a junction 71, from which the conduit 61 branches off at a junction 75, and the conduit 69 branches off at a junction 77. The junction 71 is connected to the check valve 51 on the side facing away from the switching valve 35.

The conduit 73 opens into a junction 79, from which the conduits 81, 83 and 85 originate.

The conduit 81 supplies a first sub-transmission in a sub-transmission circuit 87. The first sub-transmission has a clutch K1. The conduit 81 opens into a port 89 of a switching valve 91 which is constructed as a 3/2-way valve and serves as a safety valve for the clutch K1. In a first illustrated switching state of the switching valve 91, the port 89 is hydraulically connected to a port 93, while a port 95 of the switching valve 91 is switched blind. In a second switching state of the switching valve 91 which can be inferred from FIG. 1, the port 93 is connected to the port 95 and via the latter to the tank 3, while the port 89 is connected blind. As will become apparent below, the clutch K1 is switched unpressurized in this second switching state.

The port 93 is connected to a conduit 97 and via the latter to a port 99 of a pressure control valve 101. The pressure control valve 101 is designed as 3/2-way proportional valve having a port 103 which is connected via a conduit 105 to the clutch K1. The pressure control valve 101 additionally has on port 107 that is connected to the tank 3. In a first extreme state of the pressure control valve 101, the port 99 is connected to the port 103, while the port 107 is connected blind. The full pressure prevailing in the conduit 97 of the hydraulic fluid is then applied to the clutch K1. In a second extreme state, the port 103 is connected to the port 107 so that the clutch K1 is not pressurized. The pressure control valve 101 regulates the pressure prevailing in the clutch K1 in a conventional manner through proportional variation between these extreme states. A conduit 109 leads from the clutch K1 via a check valve 111 back to the conduit 97. When the pressure in the clutch K1 rises due to the pressure in the conduit 97, the check valve 111 opens, thereby opening a hydraulic connection between the clutch K1 to the conduit 97 via the conduit 109. A conduit 115 branches off from the conduit 109 at a junction 113 which returns the pressure in the clutch K1 as a control variable to the pressure control valve 101.

The conduit 105 includes a junction 117 for hydraulically operatively connecting a pressure detecting device 119. The pressure prevailing in the clutch K1 is thereby detected by the pressure detecting device 119.

The switching valve 91 is controlled by a pilot valve 121 which is actuated by an electric actuator 123. It is formed as a 3/2-way valve and includes the ports 125, 127 and 129. The port 125 is connected via a conduit 131 to a junction 133 provided in the conduit 81. The port 127 is connected by a conduit 135 to a valve face 137 of the switching valve 91. In a first illustrated switching state of the pilot valve 121, the port 125 is switched blind while the port 127 is connected to the port 129 and via the latter to the tank 3, whereby the valve face 137 of the switching valve 91 is switched unpressurized via the conduit 135. Preferably, the pilot valve 121 assumes this switching state when no electric control signal is applied to the actuator 123. In a second assumable switching state of the pilot valve 121, the port 125 is connected to the port 127 while the port 129 is connected blind. In this case, the pressure in the conduit 81 operates on the valve face 137 of the switching valve 91 via the junction 133, the conduit 131 and the conduit 135, causing the switching valve 91 to switch against a biasing force into its second switching state where the port 93 is hydraulically connected to the port 95, so that the clutch K1 is unpressurized. Thus, the switching valve 91 can preferably be operated by way of electrical control of the pilot valve 121, so that the clutch K1 is unpressurized and the clutch K1 is hence open.

The conduit 83 originating at the junction 79 is used to supply a clutch K2 of a hydraulic sub-circuit 139 of a second sub-transmission. Control of the clutch K2 also includes a switching valve 91', a pilot valve 121', and a pressure control valve 101'. The operation is identical to the operation already described in conjunction with the first clutch K1. Reference is therefore made to the corresponding description of the sub-transmission circuit 87. The hydraulic actuation of the clutch K2 corresponds to that of the clutch K1.

The conduit 85 originating at the junction 79 is connected to a pressure control valve 141, via which the pressure of the hydraulic medium in a conduit 143 can be controlled. The operation of the pressure control valve 141 preferably corresponds to the operation of the pressure control valves 101, 101', thus making repeating the description unnecessary. The conduit 143 is connected to a junction 145, from which a conduit 147 and a conduit 149 originate. A junction 151 at which a conduit 153 originates is provided in the conduit 149, via which the pressure prevailing in the conduit 149 and thus also in the conduit 143 is returned to the pressure control valve 141 as a control variable. It is apparent that the junction 151 may also be provided in the conduits 151 or 147.

The conduit 147 is used to supply gear actuator cylinders 155 and 157 in the sub-transmission circuit 87, which are constructed as two double-acting cylinders, i.e. synchronizing cylinders.

A volume control valve 159 is provided for hydraulic actuation of the gear actuating cylinder 155, which is designed as a 4/3-way proportional valve. It has four ports 161, 163, 165 and 167. The first port 161 is connected to the conduit 147, the second port 163 is connected to a first chamber 169 of the gear actuating cylinder 155, the third port 165 is connected to a second chamber 171 of the gear actuating cylinder 155 and the fourth port 167 is connected to the tank 3. In a first extreme state of the volume control valve 159, the first port 161 is connected to the second port 163, while the third port 165 is connected to the fourth port 167. The hydraulic medium can then flow from the conduit 147 into the first chamber 169 of the gear actuating cylinder 155, while the second chamber 171 is connected via the ports 165, 167 to the tank 3 without applied pressure. A piston 173 of the gear actuating cylinder 155 is then moved in a first direction, for example for disengaging a specific gear of the dual clutch transmission or for engaging another specific gear.

In a second extreme state of the volume control valve 159, both of the port 163 and the port 165 are connected to the port 167, while the port 161 is connected blind. In this way, both chambers 169, 171 of the gear actuating cylinder 155 are connected to the tank 3 and unpressurized. The piston 173 of the gear actuating cylinder 155 then remains in its current position due to the absence of forces.

In a third extreme state of the volume control valve 159, the port 161 is connected to the port 165 and the port 163 is connected to the port 167. Hydraulic medium then flows from the conduit 147 into the second chamber 171 of the gear actuating cylinder 155, and the first cylinder chamber 169 is unpressurized in relation to the tank 3 via port 163 and the port 167. The hydraulic medium then exerts a force on the piston 173 of the gear actuating cylinder 155 such that the piston 173 is displaced in a second direction opposite to the first direction. In this way, the aforementioned specified other gear can be disengaged, or the aforementioned specified gear can be engaged.

As described above, the volume control valve 159 is designed as a proportional valve. The hydraulic medium flow coming from the conduit 147 is divided into the chambers 169, 171 by varying the valve states between the three extreme states, so that a defined speed for engaging or disengaging a gear can be specified through control/regulation of the volume flow.

A conduit 177 which opens into a volume control valve 179 used to control the gear actuating cylinder 157 branches off from the conduit 147 at a junction 175. The operation of the hydraulic control of the gear actuating cylinder 157 is the identical to that described in conjunction with the gear actuating cylinder 155, making a renewed description unnecessary.

The conduit 149 is used to supply gear actuating cylinders 155' and 157' of the second sub-transmission in the sub-transmission circuit 139, which are also controlled by volume control valves 159' and 179'. The sub-transmission circuits 87 and 139 for controlling the gear actuating cylinders 155, 155' and 157, 157', respectively, are constructed identically, so reference is made to the preceding description.

The outlet of the pump 9 is connected to a conduit 181 which leads to the hydraulic sub-circuit 59 which is preferably used in particular for cooling the clutches K1, K2. The conduit 181 runs via a cooler 183 to a volume control valve 185. A junction 187 is arranged in the conduit 181 downstream of the outlet of the pump 9 and upstream of the cooler 183, from which a conduit 189 branches off that leads to the tank 3 via a pressure relief valve 191 opening toward the tank 3. A junction 193 into which the conduit 57 opens is arranged downstream of the junction 187 and upstream of the cooler 193, with the conduit 57 coming from the switching valve 35 and being connected to its port 43. The hydraulic sub-circuit 59 can be supplied via the conduit 57 with hydraulic medium conveyed by the pump 7, when the switching valve 35 is in its second switching state. Furthermore, a bypass 195 branches off from the junction 193 which has a differential pressure valve 197 and arranged parallel to the cooler 183. The differential pressure valve 197 opens the bypass in the direction of the volume control valve 185 under overpressure. The cooler 183 can thus be bypassed.

The volume control valve 185 is designed as 4/3-way switching valve having ports 199, 201, 203, 205 and 207. The port 199 is connected to the conduit 181 via the cooler 183 and the differential pressure valve 197, respectively, as is the port 201 which is connected to the conduit 181 via a conduit 209 and a junction 211. The ports 199 and 201 thus form a common port of the flow control valve 185 because they are both connected to the conduit 181 downstream of the cooler 183. Two ports 199, 201 are shown only for sake of clarity; in actuality, only a single port, for example 199 or 201, is provided for the conduit 181 on the volume control valve 185, wherein according to an alternative embodiment, the volume control valve 185 may in fact be formed as 5/3-way switching valve with the two separate ports 199, 201. To facilitate understanding, the following discussions refer to the illustrated embodiment, bearing in mind that the ports 199 and 201 are actually only a single port that is switched accordingly. The port 203 is connected to a conduit 213 which leads via a pressure filter 215 to the tank 3. The pressure filter 215 can be bypassed by a bypass 217 with a differential pressure valve 219 that opens in the direction of the tank 3.

The port 205 of the volume control valve 185 is connected to a cooling system 221 particularly for the first clutch K1. The port 207 is connected to a second cooling system 223 particularly for the second clutch K2.

In the first extreme state of the volume control valve 185 illustrated in FIG. 1, the port 201 is connected to the port 203, while the ports 199, 205 and 207 are connected blind. The total hydraulic medium flow flowing in the hydraulic conduit 181 and through the cooler 183, respectively, is then conveyed via the ports 201, 203 into the conduit 213 and thus via the pressure filter 215 into the tank 3.

In a second extreme state, the ports 199 and 205 are connected to each other, while the ports 201, 203 and 207 are connected blind. In this state, the entire hydraulic medium flow reaching the volume control valve 185 is supplied to the first cooling system 221.

In a third extreme state of the volume control valve 185, the ports 199 and 207 are connected together. The ports 201, 203 and 205 are connected blind. In this state, the entire hydraulic medium flow flowing in the conduit 181 is therefore supplied to the second cooling system 223.

As already stated, the volume control valve 185 is designed as a proportional valve so that the intermediate states between the described extreme states can be adjusted so that the volume flow to the cooling systems 221, 223 or to the pressure filter 215 can be adjusted. The volume control valve 185 can also be operated in pulsed mode, wherein each of the three extreme states is adopted at least temporarily. The volume flow conveyed to the cooling systems 221, 223 and the pressure filter 215, respectively, and hence to the tank 3 is controlled or regulated in this mode of operation, when averaged over time.

FIG. 1 shows that a hydraulic medium flow of the conduit 57 can be added to the hydraulic medium in the conduit 181 and supplied to the hydraulic sub-circuit 59. Alternatively, only the conduit 57 may supply hydraulic medium. It should also be mentioned that the proportional valves 101, 101', 141, 159, 159', 179, 179', 185 can each be electrically proportionally adjusted in particular against a spring force.

As already stated above, the conduit 57 opens into the hydraulic sub-circuit 59, more precisely into the conduit 181 downstream of the pump 9. According to an alternative unillustrated embodiment, the conduit 57 opens into the conduit 181 preferably downstream of the cooler 183. By supplying the hydraulic medium from the high pressure circuit into the hydraulic sub-circuit 59 according to the alternative embodiment, the total volume flow through the cooler 183 is reduced. With the reduced volume flow, the pressure drop across the cooler 183 is reduced, thereby also reducing the necessary drive power for the pump 7 and/or 9. The energy required for driving the electric motor 5 is reduced by reducing the backpressures. According to another embodiment, when the backpressures or the pressure level are sufficiently reduced, irrespective of how the reduction is achieved, the pump 9 can be directly connected to the electric motor 5, i.e. the illustrated clutch 11 can be eliminated.

According to an additional unillustrated embodiment regarding the arrangement of the pressure filter 215, the pressure filter 215 is arranged in the conduit 213 not between the volume control valve 185 and the tank 3, but preferably in the conduit 181, in particular between the cooler 183 and the volume control valve 185. Preferably, the conduit 57 opens into conduit 181 downstream of the pressure filter 215. With this alternative arrangement of the pressure filter 215, which is now in the main flow of the hydraulic medium, the fraction of time during which the hydraulic fluid is filtered by the filter pressure 215 is increased. The bypass valve 219 is preferably designed for a minimum backpressure over the volume flow.

According to another embodiment and alternatively to the illustrated and described embodiment of the volume control valve 185, the switching position ranges are interchanged such that in the first switching position range the ports 199 and/or 201 are connected to the port 205 or 207 while the other ports of the volume control valve 185 are connected blind, in the second switching position range the ports 201 and/or 199 are connected to the port 3 while the other ports are connected blind, and in the third switching position range the ports 199 and/or 201 are connected to the port 207 or 205 while the remaining ports are connected blind. Interchanging the switching positions prevents, when using pulsed control for the volume control valve 185 for setting a desired hydraulic medium flow for one of the cooling systems 221 and 223, respectively, from flowing also to the other cooling system 223 or 221. Instead, the volume flow that is not conveyed to the respective cooling system 221 or 223 under pulsed operation is directed into the tank 3. In the actual design of the volume control valve 185 as a 4/3-way proportional valve, the ports 199 and 201 are always to be understood as a common or sole port for the conduit 181 to the volume control valve 185, so that in fact only one of the two ports 199, 201 is provided on the volume control valve 185.

Preferably, a device 225 for measuring the current consumption of the electric motor 5 is associated with the electric motor 5. The device 225 may also be the integrated control circuit of the electric motor 5. It is presently determined by measuring the current consumption of the electric motor 5 whether the pressure accumulator 53 needs to be charged, i.e. whether a charge requirement exists for the actuating circuit 140 which includes the sub-transmission circuits 87, 139 and the pressure control valve 141 and the pressure accumulator 53.

A larger or a smaller backpressure acts on the pump 7 depending on the position of the switching valve 35. In the illustrated first switching position, the actuating circuit is connected via the switching valve 35 with of the conveying device consisting of the electric motor 5 and the pump 7 and 9. The high pressure in the actuating circuit then acts on the output of the pump 7. When the switching valve 35 is moved into its second switching position, as mentioned above, the conveying device is connected to the sub-transmission circuit 59 or to the cooling circuit 60, which requires a comparatively lower pressure. A considerably lower pressure is then present at the output of pump 7 in the second switching position. To determine the charge requirement of the pressure accumulator 53, the electrical motor 5 is switched on at predeterminable points in time, in particular at regular time intervals, and accelerated to a specified predeterminable speed. Preferably, the acceleration occurs along a predeterminable rotation speed ramp. It is then determined based on the rotation speed and the measured current consumption whether the switching valve 35 conveys the hydraulic medium to the cooling circuit 60 or to the actuating circuit 140. If the measured current consumption value exceeds a predetermined limit value that corresponds to the high pressure conditions in the actuating circuit 140, the conclusion is drawn that the switching valve 35 actually conveys the hydraulic medium to the actuating circuit, i.e. that there is a charge requirement of the pressure accumulator 53. The electric motor 5 is then switched to a charging mode, i.e. operated to charge the pressure accumulator 53. For this purpose, for example, the rotation speed and thus the flow rate is increased. Once the pressure in the actuating circuit 140 is sufficient or a first limit value is exceeded, the switching valve 35 is moved into the second switching state, causing the hydraulic medium conveyed by the pump 7 to be transported to the cooling circuit 60 or in the transmission sub-circuit 59. The current consumption is advantageously measured during the entire operation of the electric motor 5, so that a change in the current consumption is detected during switch-over of the switching valve 35. When the detected current consumption drops below a predeterminable limit value, which at least substantially corresponds to or correlated with the pressure in the transmission sub-circuit 59 and preferably is below the first limit value due to a built-in hysteresis, it is determined that the switching valve 35 is in the second switching position and that there is no longer a charge requirement. The electric motor 5 is turned off when a cooling demand in particular for the cooling systems 221, 223 no longer exists. Otherwise, the electric motor 5 can be switched into a cooling mode so as to supply the cooling systems 221, 223 with adequately cooled hydraulic medium.

Preferably, when determining the charge requirement, the temperature of the hydraulic medium, in particular in the tank 3, is also measured and the measured current consumption is classified/weighted as a function of the actual temperature of the hydraulic medium, so as to take into account the temperature-dependent viscosity of the hydraulic medium which affects the backpressure.

Alternatively to the above-described embodiment, the switching valve 35 may also be configured as a 2/2-way switching valve.

The pressure sensor 55 may be omitted by instead determining the charge requirement from the current consumption of the electric motor 5. In accordance with the present exemplary embodiment, the illustrated pressure sensor 55 is therefore omitted. Its function is essentially performed by the device 225.

What is claimed is:

1. A method of operating a clutch transmission, with a hydraulic circuit having at least one pump for conveying a hydraulic medium and at least one pressure accumulator for receiving and providing a pressurized hydraulic medium, the method comprising:
   determining a charge requirement of the at least one pressure accumulator from a consumption of electric current of an electric motor while the pump is driven by an electric motor, and
   operating the electric motor associated with the at least one pump based on the determined charge requirement of the at least one pressure accumulator,
   wherein the hydraulic circuit comprises an actuating circuit with the pressure accumulator and a cooling circuit, the method further comprising conveying the hydraulic medium to the actuating circuit or to the cooling circuit by way of a pressure control valve that is hydraulically actuated by an actual pressure of the pressure accumulator by using the actual pressure in the accumulator to hydraulically actuate the pressure control valve, whereby based on the consumption of the electric current of the electric motor, it is determined whether the hydraulic medium is conveyed to the actuating circuit or the cooling circuit.

2. The method of claim 1, wherein the clutch transmission is a dual clutch transmission.

3. The method of claim 1, wherein the actuating circuit is at a higher pressure relative to the cooling circuit.

4. The method of claim 1, wherein the cooling circuit is at a lower pressure relative to the actuating circuit.

5. The method of claim 1, wherein the electric motor is switched to a charging mode by operating to charge the pressure accumulator, when the consumption of electric current exceeds a predetermined first limit value that corresponds to a high pressure in the actuating circuit.

6. The method of claim 1, wherein the electric motor is switched off, when the consumption of electric current drops below a predetermined second limit value that corresponds to a pressure in a transmission subcircuit of the actuating circuit.

7. The method of claim 1, further comprising measuring a temperature of the hydraulic medium and weighting a measured value of the electric current as a function of the measured temperature.

8. The method of claim 1, wherein the electric motor is switched on at predetermined points in time and is accelerated to a predetermined rotation speed.

9. A clutch transmission comprising:
   a hydraulic circuit having at least one pump conveying a hydraulic medium,
   an electric motor driving the at least one pump,
   at least one pressure accumulator for receiving and providing a pressurized hydraulic medium,
   a measuring device for measuring consumption of electric current of the electric motor, and
   a control circuit determining the charge requirement of the at least one pressure accumulator from the measured consumption of electric current while the pump is driven by the electric motor, and operating the electric motor based on a charge requirement of the at least one pressure accumulator, wherein the hydraulic circuit comprises an actuating circuit, a cooling circuit, and a hydraulically actuated pressure control valve which conveys the hydraulic medium, depending on an actual pressure in the actuating circuit, either to the actuating circuit having the pressure accumulator or to the cooling circuit, wherein based on the consumption of the electric current of the electric motor, it is determined whether the hydraulic medium is conveyed to the actuating circuit or the cooling circuit, wherein the actual pressure in the actuating circuit hydraulically actuates the pressure control valve.

10. The clutch transmission of claim 9, wherein the clutch transmission is a dual clutch transmission.

11. The clutch transmission of claim 9, wherein the actuating circuit is at a higher pressure relative to the cooling circuit.

12. The clutch transmission of claim 9, wherein the cooling circuit is at a lower pressure relative to the actuating circuit.

13. The clutch transmission of claim 9, wherein the pressure control valve is constructed as a pressure-controlled 2-way switching valve.

14. The clutch transmission of claim 13, wherein the pressure control valve has a switching hysteresis.

* * * * *